United States Patent
Hammond et al.

(10) Patent No.: US 11,088,744 B1
(45) Date of Patent: Aug. 10, 2021

(54) METHODS, SYSTEMS, AND COMPUTER READABLE MEDIA FOR 5G DIGITAL BEAMFORMING TESTING

(71) Applicant: Keysight Technologies, Inc., Santa Rosa, CA (US)

(72) Inventors: David Hammond, Morrisville, NC (US); Steffen Beyme, Cary, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/784,820

(22) Filed: Feb. 7, 2020

(51) Int. Cl.
| | |
|---|---|
| H04B 7/06 | (2006.01) |
| H04B 17/30 | (2015.01) |
| H04W 74/08 | (2009.01) |
| H04B 7/0452 | (2017.01) |
| H04W 56/00 | (2009.01) |
| H04W 72/04 | (2009.01) |
| H04W 84/04 | (2009.01) |

(52) U.S. Cl.
CPC ......... H04B 7/0617 (2013.01); H04B 7/0452 (2013.01); H04B 17/30 (2015.01); H04W 56/001 (2013.01); H04W 72/0406 (2013.01); H04W 74/0833 (2013.01); H04W 72/0446 (2013.01); H04W 84/042 (2013.01)

(58) Field of Classification Search
CPC .... H04B 7/0617; H04B 7/0452; H04B 17/30; H04W 74/0833; H04W 56/001; H04W 72/0406; H04W 72/0446; H04W 84/042
See application file for complete search history.

(56) References Cited

U.S. PATENT DOCUMENTS

| | | |
|---|---|---|
| 5,717,760 A | 2/1998 | Satterfield |
| 5,892,482 A | 4/1999 | Coleman, Jr. et al. |
| | (Continued) | |

FOREIGN PATENT DOCUMENTS

| | | | |
|---|---|---|---|
| EP | 2 330 843 A1 | 6/2011 | |
| EP | 2 512 173 A1 | 10/2012 | |
| | (Continued) | | |

OTHER PUBLICATIONS

"5G/NR—Frame Structure," ShareTechnote, pp. 1-22 (Mar. 15, 2019).

(Continued)

*Primary Examiner* — Jean B Corrielus (57) ABSTRACT

A method for 5G digital beamforming testing includes receiving emulated UE spatial positions. The method includes computing phase vectors for the emulated UEs based on the emulated UE spatial positions and communicating the phase vectors to a DUT. The method includes receiving beam weight sets from the DUT and storing the beam weight sets. The method includes computing scores for the emulated UE spatial positions from the beam weight sets and the phase vectors, and receiving, from the DUT, spatial streams and identifiers of beam weight sets to be used to transmit the spatial streams to the emulated UEs. The method includes identifying, using scores corresponding to the beam weight sets to be used to transmit the spatial streams to the emulated UEs, associations between the spatial streams and the emulated UE spatial positions. The method includes processing data in the spatial streams using the emulated UEs.

20 Claims, 8 Drawing Sheets

(56) References Cited

U.S. PATENT DOCUMENTS

| | | |
|---|---|---|
| 7,349,670 B2 | 3/2008 | Mlinarsky et al. |
| 7,890,821 B2 | 2/2011 | Music et al. |
| 7,948,254 B2 | 5/2011 | Olgaard et al. |
| 8,229,416 B2 | 7/2012 | Akman et al. |
| 8,565,193 B2 | 10/2013 | Ylitalo |
| 8,724,498 B2 | 5/2014 | Choi et al. |
| 8,805,290 B2 | 8/2014 | Guo et al. |
| 8,995,511 B2 | 3/2015 | Reed |
| 9,001,918 B2 | 4/2015 | Taori et al. |
| 9,002,290 B2 | 4/2015 | Olgaard |
| 9,077,415 B2 | 7/2015 | Josiam et al. |
| 9,083,454 B2 | 7/2015 | Wicker, Jr. et al. |
| 9,154,979 B2 | 10/2015 | Asokan et al. |
| 9,204,325 B2 | 12/2015 | Subramanian et al. |
| 9,294,324 B2 | 3/2016 | Schmidt |
| 9,407,381 B2 | 8/2016 | Kyosti et al. |
| 9,488,685 B2 | 11/2016 | Kyosti et al. |
| 9,577,669 B2 | 2/2017 | Schwenk et al. |
| 9,660,739 B2 | 5/2017 | Reed |
| 9,661,517 B2 | 5/2017 | Stott et al. |
| 9,742,508 B1 | 8/2017 | Kyosti et al. |
| 9,807,204 B2 | 10/2017 | Bergeron |
| 9,955,371 B1 | 4/2018 | Koebele et al. |
| 10,033,473 B1 | 7/2018 | Kyrolainen et al. |
| 10,103,823 B1 | 10/2018 | Kyrolainen et al. |
| 10,110,326 B1 | 10/2018 | Kyrolainen et al. |
| 10,182,355 B1 | 1/2019 | Yan et al. |
| 10,455,606 B2 | 10/2019 | Bi et al. |
| 10,484,056 B2 | 11/2019 | Garcia |
| 10,498,425 B2 * | 12/2019 | Kutz ..................... H04B 7/043 |
| 2003/0065812 A1 | 4/2003 | Beier et al. |
| 2003/0195735 A1 | 10/2003 | Rosedale et al. |
| 2006/0229018 A1 | 10/2006 | Mlinarsky et al. |
| 2006/0233111 A1 | 10/2006 | Wright |
| 2007/0243826 A1 | 10/2007 | Liu |
| 2008/0049861 A1 | 2/2008 | Yang |
| 2009/0094492 A1 | 4/2009 | Music et al. |
| 2009/0262719 A1 | 10/2009 | Shim et al. |
| 2010/0075678 A1 | 3/2010 | Akman et al. |
| 2010/0184447 A1 | 7/2010 | Miki et al. |
| 2010/0195743 A1 | 8/2010 | Barsoum et al. |
| 2010/0285753 A1 | 11/2010 | Foegelle |
| 2010/0290371 A1 | 11/2010 | Beale |
| 2011/0086659 A1 | 4/2011 | Yoon et al. |
| 2011/0170439 A1 | 7/2011 | Miki et al. |
| 2011/0200084 A1 | 8/2011 | Griesing et al. |
| 2011/0206151 A1 | 8/2011 | McCloud et al. |
| 2011/0293028 A1 | 12/2011 | Panicker et al. |
| 2011/0306306 A1 | 12/2011 | Reed |
| 2012/0033650 A1 | 2/2012 | Ahn et al. |
| 2012/0051271 A1 | 3/2012 | Beale |
| 2012/0063384 A1 | 3/2012 | Bi et al. |
| 2012/0100813 A1 | 4/2012 | Mow et al. |
| 2012/0309323 A1 | 12/2012 | Guo et al. |
| 2013/0155872 A1 | 6/2013 | Subramanian et al. |
| 2013/0155878 A1 | 6/2013 | Deng et al. |
| 2013/0208603 A1 | 8/2013 | Choi et al. |
| 2013/0210474 A1 | 8/2013 | Kyösti |
| 2013/0286860 A1 | 10/2013 | Dorenbosch et al. |
| 2014/0024318 A1 | 1/2014 | Sevindik et al. |
| 2014/0086075 A1 | 3/2014 | Asokan et al. |
| 2014/0140271 A1 | 5/2014 | Devarasetty et al. |
| 2014/0141728 A1 | 5/2014 | Devarasetty et al. |
| 2014/0187260 A1 | 7/2014 | Jiang et al. |
| 2014/0269527 A1 | 9/2014 | Asokan |
| 2015/0017928 A1 | 1/2015 | Griesing et al. |
| 2015/0092824 A1 | 4/2015 | Wicker, Jr. et al. |
| 2015/0257073 A1 | 9/2015 | Park et al. |
| 2016/0050569 A1 | 2/2016 | Olgaard et al. |
| 2016/0095104 A1 | 3/2016 | Chen et al. |
| 2016/0126976 A1 | 5/2016 | Schwenk et al. |
| 2016/0192353 A1 | 6/2016 | Abdoli et al. |
| 2016/0204507 A1 | 7/2016 | Karjalainen |
| 2016/0212641 A1 | 7/2016 | Kong et al. |
| 2016/0233970 A1 | 8/2016 | Reed |
| 2016/0261723 A1 | 9/2016 | Bergeron |
| 2016/0285572 A1 | 9/2016 | Manghal et al. |
| 2016/0344490 A1 | 11/2016 | Foegelle |
| 2016/0373196 A1 | 12/2016 | Stott et al. |
| 2017/0019154 A1 | 1/2017 | Reed |
| 2017/0184698 A1 | 6/2017 | Rueth |
| 2017/0373773 A1 | 12/2017 | Jing et al. |
| 2018/0048399 A1 | 2/2018 | Thiruvarankan |
| 2018/0062971 A1 | 3/2018 | Kyosti et al. |
| 2018/0076907 A1 | 3/2018 | Naseef et al. |
| 2018/0098349 A1 | 4/2018 | Sun et al. |
| 2018/0123648 A1 | 5/2018 | Nagaraja et al. |
| 2018/0199359 A1 | 7/2018 | Cao et al. |
| 2018/0324023 A1 | 11/2018 | Zeng et al. |
| 2019/0004102 A1 | 1/2019 | Gienger et al. |
| 2019/0044583 A1 | 2/2019 | Garcia |
| 2019/0173560 A1 * | 6/2019 | Chapman ............. H04B 7/0617 |
| 2020/0083967 A1 * | 3/2020 | Garcia ................ H04B 17/102 |
| 2020/0389847 A1 * | 12/2020 | Deng .................. H04B 7/0617 |

FOREIGN PATENT DOCUMENTS

| | | |
|---|---|---|
| EP | 2 597 794 A1 | 5/2013 |
| EP | 3 224 969 B1 | 2/2020 |
| EP | 3657702 A1 | 5/2020 |
| WO | WO 2011/148030 A1 | 12/2011 |
| WO | WO 2015/050974 A1 | 4/2015 |
| WO | WO 2016/209338 A1 | 12/2016 |
| WO | WO 2017/091713 A1 | 6/2017 |

OTHER PUBLICATIONS

"Bringing Field Testing Into the 5G Lab System Verification Life Cycle," VIAVI Solutions, pp. 1-8 (2019).

DeTomasi, Sheri, "Understanding 5G New Radio Bandwidth Parts," Keysight Technologies Inc., pp. 1-7 (Oct. 31, 2018).

Ghosh, Amitabha, "5G New Radio (NR): Physical Layer Overview and Performance IEEE Communication Theory Workshop," Nokia, pp. 1-38 (May 2018).

"Seven Things You Need To Know About 5G New Radio," Keysight Technologies Inc., pp. 1 (Feb. 1, 2018).

Notice of Allowance and Fee(s) Due for U.S. Appl. No. 14/640,959 (dated Jun. 30, 2017).

Non-Final Office Action for U.S. Appl. No. 14/640,959 (dated Mar. 8, 2017).

Notice of Allowance and Fee(s) Due for U.S. Appl. No. 14/531,953 (dated Oct. 6, 2016).

Non-Final Office Action for U.S. Appl. No. 14/531,953 (dated Jun. 6, 2016).

Notice of Allowance for U.S. Appl. No. 13/396,577 (dated Dec. 18, 2013).

Non-Final Office Action for U.S. Appl. No. 13/396,577 (dated Aug. 8, 2013).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

Decision to Grant European Patent Application Serial No. 16814847.6 (dated Jan. 30, 2020).

Notification of European publication number and information on the application of Article 67(3) EPC for European Application Serial No. 20151252.2 (dated Apr. 30, 2020).

(56) References Cited

OTHER PUBLICATIONS

Extended European Search Report for European Application Serial No. 20151252.2 (dated Feb. 13, 2020).
Notice of Allowance and Fee(s) Due for U.S. Appl. No. 16/214,021 (dated Mar. 25, 2020).
Notice of Allowance and Fee(s) Due for U.S. Appl. No. 16/214,021 (dated Dec. 17, 2019).
Commonly assigned, co-pending U.S. Appl. No. 16/214,021 for "Methods, Systems, and Computer Readable Media for Testing and Modeling Beamforming Capabilities of a Device Under Test," (unpublished, filed Dec. 7, 2018).
Notice of Allowance and Fee(s) Due for U.S. Appl. No. 15/819,900 (dated Sep. 12, 2018).
Communication of the Extended European Search Report for European Patent Application Serial No. 16814847.6 (dated Jul. 4, 2018).
Communication pursuant to Article 94(3) EPC for European Patent Application Serial No. 14 850 849.2 (dated Mar. 26, 2018).
Communication of the Extended European Search Report for European Patent Application No. 14850849.2 (dated Apr. 19, 2017).
Notice of Allowance and Fee(s) Due for U.S. Appl. No. 14/746,733 (dated Jan. 20, 2017).
"IXLOAD®—Wireless XAIR2," Data Sheet, Ixia, A Keysight Business, 915-2744-01-3071 Rev B, pp. 1-6 (2017).
Notice of Allowance and Fee(s) Due for U.S. Appl. No. 14/746,733 (dated Oct. 7, 2016).
Notification of Transmittal of the International Search Report and the Written Opinion of the International Searching Authority, or the Declaration for Internation Application No. PCT/US2016/028320 (dated Jul. 26, 2016).
Communication of European publication number and information on the application of Article 67(3) EPC for European Patent Application No. 14850849.2 (dated Jul. 13, 2016).
Notice of Allowance and Fee(s) Due for U.S. Appl. No. 14/043,799 (dated Mar. 3, 2015).
Notification of Transmittal of the International Search Report and the Written Opinion of the International Searching Authority, or the Declaration for International Application No. PCT/US2014/058601 (dated Dec. 23, 2014).
Ex Parte Quayle Office Action for U.S. Appl. No. 14/043,799 (dated Dec. 3, 2014).
Doshi et al., "Network Design and Implementation using Emulation-Based Analysis," Military Communications Conference, IEEE pp. 1-9 (2007).
"UL Virtual MIMO Scheduling," 3GPP TSG-RAN1, Meeting #43, R1-051423, Nortel, pp. 1-7 (Nov. 7-11, 2005).
Notice of Allowance and Fee(s) Due for U.S. Appl. No. 15/666,028 (dated Jun. 21, 2019).
Non-Final Office Action for U.S. Appl. No. 15/666,028 (dated Jan. 24, 2019).
Ramalingam, Manoharan, "5G NR Beam Management and Beam Scheduling (everything about beams)," Linkedin.com, pp. 1-5 (Dec. 7, 2018).
Notice of Allowance and Fee(s) Due for U.S. Appl. No. 15/721,754 (dated Aug. 8, 2018).
Notice of Allowance and Fee(s) Due for U.S. Appl. No. 15/721,757 (dated May 23, 2018).
Notice of Allowance and Fee(s) Due for U.S. Appl. No. 15/721,754 (dated Apr. 20, 2018).
Non-Final Office Action for U.S. Appl. No. 15/254,414 (dated Mar. 8, 2018).
Giordani et al., "A Tutorial on Beam Management for 3GPP NR at mm Wave Frequencies," IEEE, pp. 1-22 (Apr. 5, 2018).
"Keysight Technologies Testing 5G: Data Throughput," Keysight Technologies, Inc., pp. 1-24 (Dec. 7, 2017).
Campos, Javier, "Understanding the 5G NR Physical Layer," Keysight Technologies, Inc., pp. 1-111 (Nov. 1, 2017).
Kyosti et al., "On Dimensions of OTA Setups for Massive MIMO Base Stations Radiated Testing," IEEE Access, pp. 5971-5981 (Oct. 6, 2016).
Jiann-Ching Guey et al., "Modeling and Evaluation of Beam Tracking in Mobile Millimeter Wave Communication", 2015 IEEE 26th International Symposium on Personal, Indoor and Mobile Radio Communications—(PIMRC): Fundamentals and PHY, pp. 775-780. (2015).
Yu et al., "Radiated Two-Stage Method for LTE MIMO User Equipment Performance Evaluation," IEEE Transactions on Electromagnetic Compatbility, vol. 56, No. 6, pp. 1691-1696 (Dec. 2014).
Schirmer et al., "3D Wave-Field Synthesis for Testing of Radio Devices," The 8th European Conference on Antennas and Propagation, pp. 3394-3398 (2014).
Kyosti et al., "Channel Modelling for Multiprobe Over-the-Air MIMO Testing," Hindawi Publishing Corporation, International Journal of Antennas and Propagation, vol. 2012, Article ID 615954, pp. 1-11 (Mar. 2012).

\* cited by examiner

FIG. 1

FIG. 2 eCPRI BEAM SCORE TABLE

WEIGHT AND PHASE VECTOR ARE USED TO CALCULATE A SCORE FOR EACH UE POSITION

UE POSITION NUMBER

| | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| WEIGHT SET 1  | 90 | 31 | 05 | 03 | 05 | 07 | 02 | 05 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 2  | 15 | 89 | 32 | 03 | 05 | 07 | 02 | 05 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 3  | 01 | 14 | 87 | 33 | 05 | 07 | 02 | 05 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 4  | 01 | 05 | 22 | 90 | 35 | 07 | 02 | 05 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 5  | 03 | 05 | 05 | 14 | 86 | 22 | 02 | 05 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 6  | 01 | 05 | 05 | 03 | 15 | 85 | 21 | 05 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 7  | 01 | 05 | 05 | 03 | 05 | 17 | 93 | 19 | 09 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 8  | 01 | 05 | 05 | 03 | 05 | 07 | 12 | 91 | 17 | 02 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 9  | 02 | 05 | 05 | 03 | 05 | 07 | 02 | 25 | 88 | 23 | 04 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 10 | 01 | 05 | 05 | 03 | 05 | 07 | 02 | 05 | 19 | 79 | 18 | 05 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 11 | 01 | 05 | 05 | 03 | 05 | 07 | 02 | 05 | 09 | 12 | 85 | 20 | 06 | 05 | 05 | 08 | 00 | 05 | 05 | 05 | 03 | 05 | 07 | 02 | 05 | 09 | 02 | 04 | 05 | 06 | 05 | 08 |
| WEIGHT SET 12 | 01 | 05 | 05 | 03 | 05 | 07 | 02 | 05 | 09 | 02 | 14 | 88 | 22 | 05 | 05 | 08 | 00 | 05 | 05 | 05 | 03 | 05 | 07 | 02 | 05 | 09 | 02 | 04 | 05 | 06 | 05 | 08 |
| WEIGHT SET 13 | 04 | 05 | 05 | 03 | 05 | 07 | 02 | 05 | 09 | 02 | 04 | 15 | 86 | 18 | 05 | 08 | 00 | 05 | 05 | 05 | 03 | 05 | 07 | 02 | 05 | 09 | 02 | 04 | 05 | 06 | 05 | 08 |
| WEIGHT SET 14 | 01 | 05 | 05 | 03 | 05 | 07 | 02 | 05 | 09 | 02 | 04 | 05 | 16 | 93 | 15 | 08 | 00 | 05 | 05 | 05 | 03 | 05 | 07 | 02 | 05 | 09 | 02 | 04 | 05 | 06 | 05 | 08 |
| WEIGHT SET 15 | 01 | 05 | 05 | 03 | 05 | 07 | 02 | 05 | 09 | 02 | 04 | 05 | 06 | 25 | 94 | 13 | 00 | 05 | 05 | 05 | 03 | 05 | 07 | 02 | 05 | 09 | 02 | 04 | 05 | 06 | 05 | 08 |
| WEIGHT SET 16 | 01 | 05 | 05 | 03 | 05 | 07 | 02 | 05 | 09 | 02 | 04 | 05 | 06 | 05 | 15 | 85 | 22 | 05 | 05 | 05 | 03 | 05 | 07 | 02 | 05 | 09 | 02 | 04 | 05 | 06 | 05 | 08 |

METHODS, SYSTEMS, AND COMPUTER READABLE MEDIA FOR 5G DIGITAL BEAMFORMING TESTING

TECHNICAL FIELD

The subject matter described herein relates to the test and characterization of wireless mobile network infrastructure. Specifically, the subject matter described herein introduces methods and a system for emulating beamforming to enable multi-user, massive multiple input multiple output (MU-MIMO) testing.

BACKGROUND

With 5G and massive MIMO, the need arises for comprehensive testing of the complex beamforming operations performed by the base station based on feedback from subscriber units, or reciprocity. Unlike previous generations, 5G relies heavily on multi-user, massive MIMO techniques which require the use of phased-array antennas, presenting a significant challenge to makers of test equipment for 5G infrastructure. Due to the large number of array elements involved, it can be impractical to perform conducted radio frequency (RF) tests, while over the air (OTA) testing, due to its reliance on anechoic RF chambers, is both expensive and limited in scale. Such limitations include the number and mobility of large numbers of subscribers, or the introduction of realistic channel conditions, etc.

Due to the antenna signal processing requirements associated with beamforming, there is a trend to separate the network elements into central unit (CU), distributed unit (DU) and radio unit (RU). This separation is reflected in several standardized functional splits of the protocol stack, which have in common that the interface between DU and RU is no longer based on conventional streams of time-domain baseband samples (such as common public radio interface (CPRI)), but rather on representations of the sub-carrier data (common as well as multi-user data) in the frequency domain (as supported by evolved CPRI (eCPRI)), subsequently referred to as "spatial streams". Under this model, the RU is responsible for applying suitable beamforming weights to spatial streams in order to steer beam energy in, or combine energy from, the direction of the user associated with a given spatial stream and transform the signals to/from the time-domain for every radiating element of the array antenna. In essence, the RU converts between frequency-domain spatial stream data and RF signals for every radiating element of the array antenna, using appropriate sets of beamforming weights for each spatial stream. In one common implementation of these principles, the beamforming weights (also referred to herein as beam weights) are computed by the DU and communicated to the RU through control plane messages.

From a test system point of view, the combination of RU with an array antenna must be treated as a black box. Due to the practical challenges of interfacing to array antennas, be it conducted or over the air, testing of the DU and in particular its beamforming functions under emulated multi-user traffic can be cast as a problem of modeling and substituting the RU along with its array and the spatial channel, by the test system.

One problem encountered by a test system that emulates an RU in combination with multiple UEs is that, unlike the case of real UEs, the test system is required to identify, from the spatial streams received from the DU, to which emulated UE each spatial stream is to be directed. In real networks because of beamforming implemented by the RU, only the UE that is designated to receive a particular spatial stream will receive it. Accordingly, there is no need for a real UE to identify which spatial stream is intended for it because the UE only receives spatial streams that are intended for that UE. Similarly, there is no need for the RU in a real network to identify which spatial stream is intended for which UE. The CU/DU provides the RU with spatial stream data and a set of beamforming weights to use to configure the array antenna elements of the RU to transmit the spatial stream. The RU uses the beamforming weights to transmit the spatial stream, and only the UE located at the spatial position corresponding to the beamforming weights should receive the spatial stream with a sufficiently high signal to noise ratio for decoding by the UE.

In a test system that emulates the RU communicating with multiple UEs, there is no physical spatial separation between the emulated UEs. The test system will receive spatial stream data and beamforming weights from the DU. The DU will instruct the RU to apply specific sets of beamforming weights to specific portions of the spatial stream data. However, as stated above, the DU does not communicate to the RU which beamforming weights or which spatial streams are associated with which UE. Accordingly, in a test system that emulates the RU and the UEs, the test system must be capable of identifying data that is intended for a particular UE so that the test system can appropriately respond to the data.

In light of these difficulties, there exists a need for improved methods, systems, and computer readable media for 5G digital beamforming testing in an MU-MIMO environment.

SUMMARY

The subject matter described herein includes a method and a system, in which spatial streams and beamforming weight sets are processed in a manner such that realistic MU-MIMO emulation can be performed without the need to interface to an array antenna, for the purpose of comprehensive testing of 5G network infrastructure, such as the DU and/or CU.

A method for 5G digital beamforming testing includes receiving, as input, emulated user equipment (UE) spatial positions for a plurality of emulated UEs. The method further includes computing phase vectors for the emulated UEs based on the emulated UE spatial positions. The method further includes communicating the phase vectors to a device under test (DUT). The method further includes receiving beam weight sets from the DUT and storing the beam weight sets. The method further includes computing scores for the emulated UE spatial positions from the beam weight sets and the phase vectors. The method further includes receiving, from the DUT, a plurality of spatial streams and identifiers of beam weight sets to be used to transmit the spatial streams to the emulated UEs. The method further includes identifying, using scores corresponding to the beam weight sets to be used to transmit the spatial streams to the emulated UEs, associations between the spatial streams and the emulated UE spatial positions. The method further includes processing data in the spatial streams using the emulated UEs whose emulated spatial positions are identified as being associated with the spatial streams and responding to the DUT based on the data.

According to another aspect of the subject matter described herein, computing the phase vectors comprises, for each of the emulated UEs, computing a set of phase values indicative of an emulated spatial channel between an emulated UE spatial position and emulated radio unit (RU) antenna elements of an emulated RU antenna array.

According to another aspect of the subject matter described herein, communicating the phase vectors to the DUT includes using the phase vectors to generate sounding reference symbols (SRSs) and transmitting the SRSs to the DUT, which enables the DUT to estimate an emulated spatial channel.

According to another aspect of the subject matter described herein, receiving the beam weight sets from the DUT includes receiving the beam weight sets from the DUT in response to the SRSs.

According to another aspect of the subject matter described herein, computing the scores includes computing an array factor for each emulated UE spatial position and beam weight set, where the array factor indicates an antenna gain of a spatial stream given by a beam weight set to be used to transmit the spatial stream in a direction corresponding to the phase vector for the emulated UE position.

According to another aspect of the subject matter described herein, identifying associations between the spatial streams and the emulated UE spatial positions includes: determining, from control channel information received from the DUT, a set of emulated UEs that have physical resource block (PRB) grants in the spatial streams; for each emulated UE in the set of emulated UEs that has PRB grants in the spatial streams, performing a lookup in a score table using the identifiers for the beam weight sets to be used to transmit the spatial streams to the emulated UEs and identifying a set of scores for each beam weight set-emulated UE combination; identifying, from the set of scores for each emulated UE that has PRB grants in the spatial streams, a highest score and a corresponding one of the beam weight sets to be used to transmit the spatial streams; and selecting as the spatial stream having PRB grants for an emulated UE, the spatial stream corresponding to the beam weight set having the highest score for the emulated UE.

According to another aspect of the subject matter described herein, processing the data in the spatial streams extracting data from the PRBs in the spatial stream identified has having PRB grants for the emulated UE and using the data to formulate a response to the DUT.

According to another aspect of the subject matter described herein, the DUT comprises a 5G distributed unit (DU), a 5G central unit (CU), or a combination of a 5G DU and CU.

According to another aspect of the subject matter described herein, the steps of the 5G digital beamforming testing method are implemented by a combined RU emulator and multi-UE emulator.

According to another aspect of the subject matter described herein, the method for 5G digital beamforming testing includes monitoring, by each of the emulated UEs, emulated UE synchronization signal block (SSB) transmissions from the DUT, identifying a serving SSB for each emulated UE spatial position by correlating a phase vector for the emulated UE with all active SSB beams, initiating, by each of the emulated UEs, a 5G UE attach procedure by sending a physical random access channel (PRACH) preamble to the DUT in a time slot corresponding to the SSB beam identified as the serving SSB beam for a UE.

According to another aspect of the subject matter described herein, a test system for 5G digital beamforming testing includes at least one processor; and a radio unit (RU) emulator and multi-user equipment (UE) emulator implemented by the at least one processor. The RU emulator and multi-UE emulator is configured for receiving, as input, emulated UE spatial positions for a plurality of emulated UEs, computing phase vectors for the emulated UEs based on the emulated UE spatial positions, communicating the phase vectors to a device under test (DUT), receiving beam weight sets from the DUT and storing the beam weight sets, computing scores for the emulated UE spatial positions from the beam weight sets and the phase vectors, receiving, from the DUT, a plurality of spatial streams and identifiers of beam weight sets to be used to transmit the spatial streams to the emulated UEs, identifying, using scores corresponding to the beam weight sets to be used to transmit the spatial streams to the emulated UEs, associations between the spatial streams and the emulated UE spatial positions, and processing data in the spatial streams using the emulated UEs whose emulated spatial positions are identified as being associated with the spatial streams and responding to the DUT based on the data.

According to another aspect of the subject matter described herein, the RU emulator and multi-UE emulator is configured to compute the phase vectors by computing, for each of the emulated UEs, a set of phase values indicative of an emulated spatial channel between an emulated UE spatial position and emulated radio unit (RU) antenna elements of an emulated RU antenna array.

According to another aspect of the subject matter described herein, the RU emulator and multi-UE emulator is configured to use the phase vectors to generate sounding reference symbols (SRSs) and transmit the SRSs to the DUT, which enables the DUT to perform channel estimation for an emulated spatial channel.

According to another aspect of the subject matter described herein, the RU emulator and multi-UE emulator is configured to receive the beam weight sets from the DUT in response to the SRSs.

According to another aspect of the subject matter described herein, the RU emulator and multi-UE emulator is configured to compute the scores by computing an array factor for each emulated UE spatial position and beam weight set, where the array factor indicates an antenna gain of a spatial stream given by a beam weight set to be used to transmit the spatial stream in a direction corresponding to the phase vector for the emulated UE position.

According to another aspect of the subject matter described herein, the RU emulator and multi-UE emulator is configured to identify associations between the spatial streams and the emulated UE spatial positions by:

determining, from control channel information received from the DUT, a set of emulated UEs that have physical resource block (PRB) grants in the spatial streams; for each emulated UE in the set of emulated UEs that has PRB grants in the spatial streams, performing a lookup in a score table using the identifiers for the beam weight sets to be used to transmit the spatial streams to the emulated UEs and identifying a set of scores for each beam weight set-emulated UE combination; identifying, from the set of scores for each emulated UE that has PRB grants in the spatial streams, a highest score and a corresponding one of the beam weight sets to be used to transmit the spatial streams; and selecting as the spatial stream having PRB grants for an emulated UE, the spatial stream corresponding to the beam weight set having the highest score for the emulated UE.

According to another aspect of the subject matter described herein, the RU emulator and multi-UE emulator is configured to process the data in the spatial streams by extracting data from the PRBs in the spatial stream identified has having PRB grants for the emulated UE and using the data to formulate a response to the DUT.

According to another aspect of the subject matter described herein, the RU emulator and multi-UE emulator is configured to: monitor, by each of the emulated UEs, emulated UE synchronization signal block (SSB) transmissions from the DUT; identify a serving SSB for each emulated UE spatial position by correlating a phase vector for the emulated UE with all active SSB beams; initiate, by each of the emulated UEs, a 5G UE attach procedure by sending a physical random access channel (PRACH) preamble to the DUT in a time slot corresponding to the SSB beam identified as the serving SSB beam for a UE.

According to another aspect of the subject matter described herein, a non-transitory computer readable medium having stored thereon executable instructions that when executed by the processor of a computer control the computer to perform steps. The steps include receiving, as input, emulated user equipment (UE) spatial positions for a plurality of emulated UEs. The steps further include computing phase vectors for the emulated UEs based on the emulated UE spatial positions. The steps further include communicating the phase vectors to a device under test (DUT). The steps further include receiving beam weight sets from the DUT and storing the beam weight sets. The steps further include computing scores for the emulated UE spatial positions from the beam weight sets and the phase vectors. The steps further include receiving, from the DUT, a plurality of spatial streams and identifiers of beam weight sets to be used to transmit the spatial streams to the emulated UEs. The steps further include identifying, using scores corresponding to the beam weight sets to be used to transmit the spatial streams to the emulated UEs, associations between the spatial streams and the emulated UE spatial positions. The steps further include processing data in the spatial streams using the emulated UEs whose emulated spatial positions are identified as being associated with the spatial streams and responding to the DUT based on the data.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 3 is a diagram of an example beam score table that may be generated by the test system of FIG. 1;

DETAILED DESCRIPTION

In one implementation of the subject matter described herein, the multi-user data at the DU/RU user plane (U-plane) interface is assumed to be represented in the form of multiple spatial streams in the frequency or subcarrier domain. For every spatial stream, there is furthermore a corresponding set of beamforming weights (also referred to herein as beam weights) provided by the DU, at the DU/RU control plane (C-plane) interface. More advanced 5G beamforming methods are based on channel estimates (CSI) obtained by the DU from subscriber transmissions of uplink sounding reference symbols (SRS). The subject matter described herein allows for spatial SRS reception by the DU, consistent with the beamforming weights for the corresponding stream.

A central problem with this approach for emulating subscribers arises from the fact that the U-plane spatial sample streams themselves carry no explicit indication that would allow association with a target subscriber. This information is implicit in the beamforming weights. Using the known array geometry and carrier frequency, it is possible to compute the array factor or antenna gain for a given beamforming vector b, in the direction r of a subscriber u.

The signal received in a given subscriber direction, y(r), which may be conveniently specified e.g., in an (azimuth, elevation) coordinate, is generally a function of the spatial streams x(u) for all users u ∈ U in the direction r, the beamforming vectors b(u), and the phase vector a(r) in the direction r.

$$y(r) = \Sigma_{u \in U} a^H(r) b(u) x(u) \quad (1)$$

However, it can be assumed that at a given subscriber position, multiuser precoding performed by the DU results in a significant attenuation of the array factors for spatial streams associated with the other subscribers. Under some conditions it is therefore possible to "rank" the array factors and use the maximum array factor to decide, which beamforming vector and thus, which spatial stream represents the best association with a given subscriber u in the direction r.

$$u_{max}(r) = \underset{u \in U}{\operatorname{argmax}} \|a^H(r) b(u)\| \quad (2)$$

The array factors are ranked by their magnitudes, which we will refer to as "score". This method allows very efficient implementations.

Figure 1:
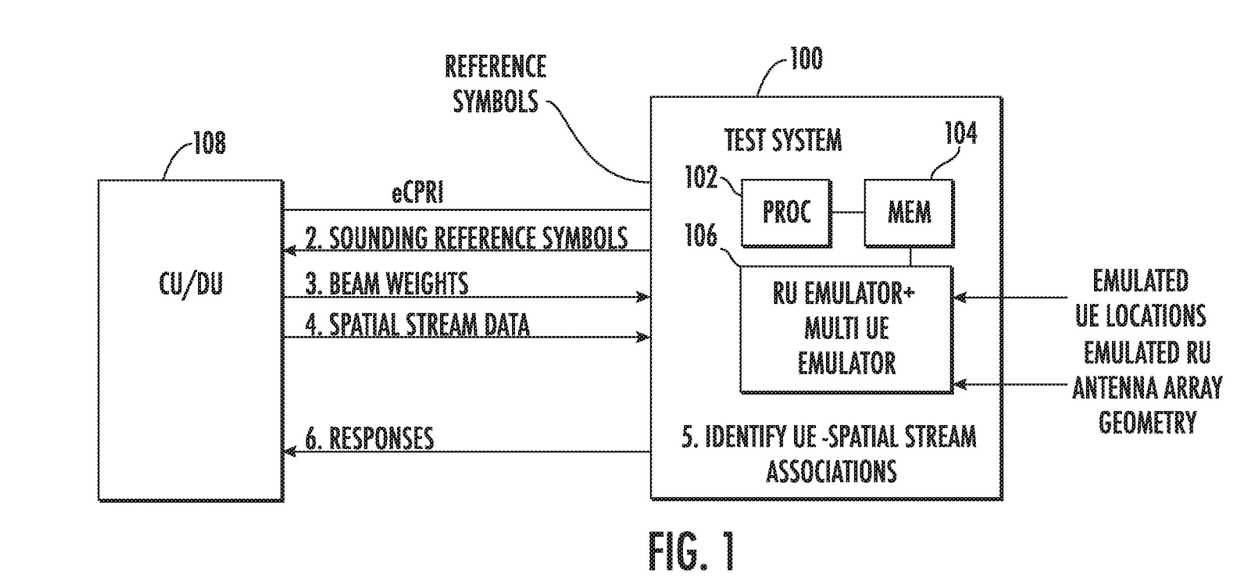
FIG. 1 is a block diagram illustrating a test system that emulates an RU and multiple UEs to test the channel estimate and beamforming weight generation capabilities of a CU/DU.

FIG. 1 is a block diagram illustrating a test system for testing beamforming capabilities of a device under test. The beamforming capabilities tested by the test systems and methods described herein include the capabilities of the test system to perform channel estimation based on channel phase vectors received from emulated UEs and to generate proper beamforming weight sets based on results of the channel estimation. In FIG. 1, test system 100 emulates an RU and multiple UEs. Test system 100 includes at least one processor 102 and memory 104. An RU emulator and multi-UE emulator 106 may execute on processor 102 to perform the RU emulation and multi-UE emulation functions described herein. Test system 100 is designed to test device under test 108, which in the illustrated example is a combined central unit (CU) and distributed unit (DU). It should be noted that test system 108 may be a CU, a DU, or a combination of a DU and a CU. The interface between test system 100 and device under test 108 is the eCPRI interface. The eCPRI interface, in one test setup, may be simulated using a cable. However, the testing may also occur over an air interface.

Referring to the message flow diagram in FIG. 1, in step 1, RU emulator and multi-UE emulator 106 receives emulated UE locations or spatial positions. The emulated UE locations or spatial positions may be input by a test operator. In one example, the emulated UE positions may be azimuth and elevation values with respect to an emulated RU and antenna array geometry. The test operator may also input emulated RU antenna array geometry specifying the number and configuration of emulated RU antenna array elements. Alternatively, RU emulator and multi-UE emulator 106 may be preconfigured with an emulated RU antenna array geometry.

Upon receiving the emulated UE locations, RU emulator and multi-UE emulator 106 calculates phase vectors for each of the emulated UEs. The phase vectors represent the spatial channels between the antenna elements of the emulated RU array antenna and each of the emulated UE locations. In step 2 in the diagram, RU emulator and multi-UE emulator 106 communicates the phase vectors to device under test 108. The phase vectors may be communicated to the device under test 108 via sounding reference symbols.

In step 3, RU emulator and multi-UE emulator 106 receives beam weights from DUT 108. The beam weights may be communicated in beam weight sets with corresponding beam index values. It should be noted that the beam weight sets do not indicate to which UE each beam weight set applies. The beam weight sets are simply to be used by the RU in communicating data to UEs. RU emulator and multi-UE emulator 106 stores the beam weight sets along with the corresponding beam index values. RU emulator and multi-UE emulator 106 computes scores for the emulated UE spatial positions from the beam weight sets and the phase vectors. The scores may be computed using equation 2. The scores may be stored in a beam score table that correlates beam weight sets with emulated UE spatial positions. The beam weight set having the maximum score for a given UE spatial position is determined to be the beam weight set associated with the UE spatial position.

In step 4 in FIG. 1, RU emulator and multi-UE emulator 106 receives spatial stream data from device under test 108. The spatial stream data does not identify to which UE the spatial stream data is directed. RU emulator and multi-UE emulator 106, in step 5, identifies UE-spatial stream associations using the scores and processes data in the spatial streams using the emulated UEs whose emulated spatial positions are identified as being associated with the spatial streams. In step 6, RU emulator and multi-UE emulator 106 responds to device under test 108 for each emulated UE that receives data during a given transmission.

Figure 2:
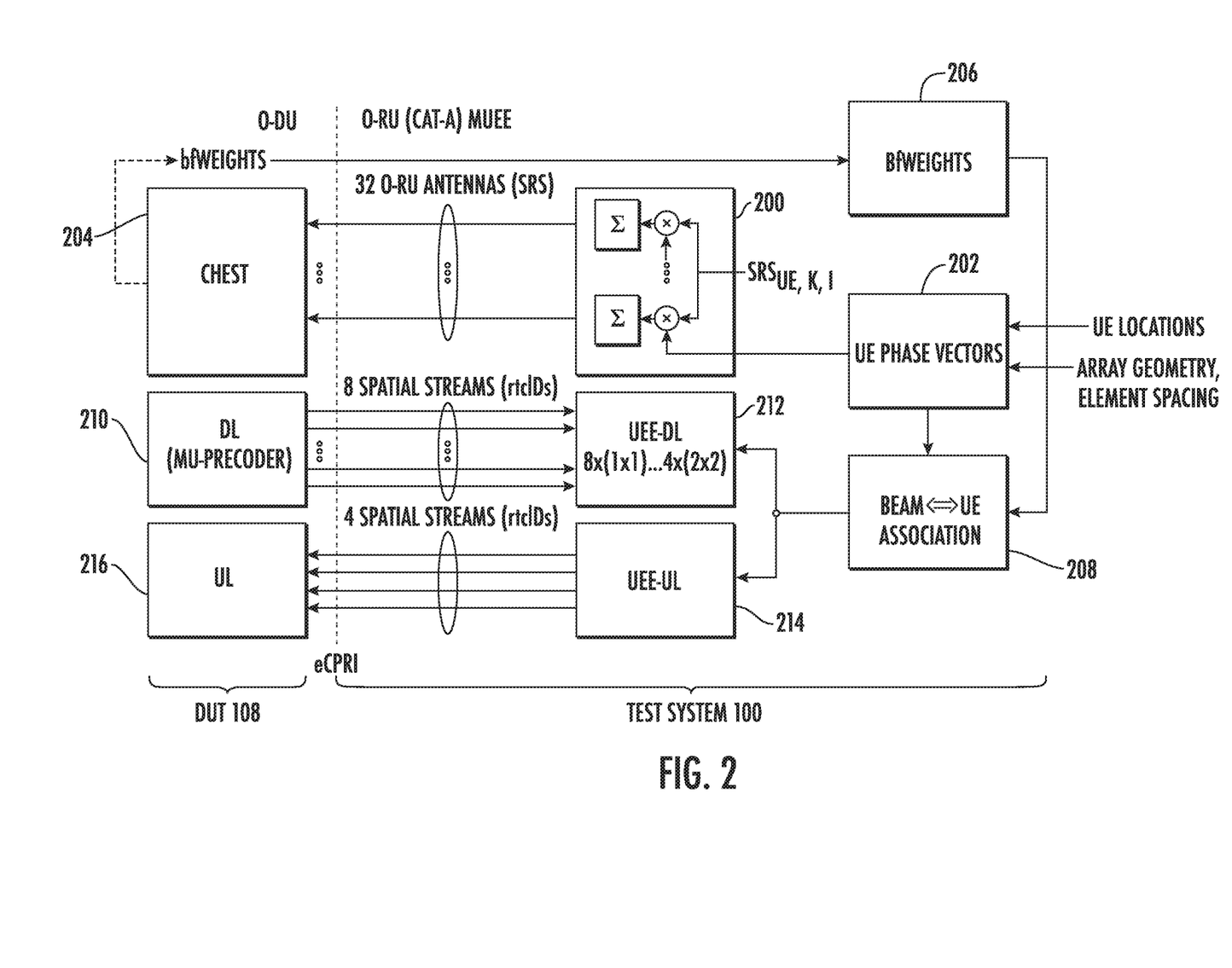
FIG. 2 is a block diagram illustrating the test system and the device under test in FIG. 1 in more detail.

FIG. 2 is a block diagram illustrating the architecture in FIG. 1 in more detail. In FIG. 2, the dashed line represents the eCPRI interface. The blocks to the left hand side of the dashed line represent DUT 108. The blocks to the right hand side of the dashed line indicate components of test system 100. In FIG. 2, test system 100 includes SRS generator 200 that generates sounding reference symbols to transmit to device under test 108 using UE phase vectors 202 and antenna array geometry input received from the user. Device under test 108 includes a channel estimator 204 that generates beamforming weights based on the UE phase vectors and communicates the beamforming weights to test system 100. Test system 100 stores beamforming weights 206 in a table the table includes the beamforming weights and beam indexes corresponding to the beamforming weights but does not associate the beamforming weights UEs.

Test system 100 computes the above referenced beam score table from the beamforming weights and the UE phase vectors and uses the scores to make beam-UE associations 208. Device under test 108 includes a downlink block 210 that sends spatial streams to UE emulator downlink block 212 of test system 100, which receives the spatial streams and identifies which spatial stream is associated with which UE using the beam-UE associations 208. Test system 100 includes UE emulator uplink block 214 that formulates uplink data from the emulated UEs that received spatial streams and forwards the uplink spatial streams to a corresponding uplink block 216 of DUT 108.

FIG. 3 is an example of a beam score table that may be computed by RU emulator and multi-UE emulator 106. Referring to FIG. 3, each column in the beam score table corresponds to a UE spatial position. Each row corresponds to a beam weight set. Each cell indicates a score for the given weight set and UE position. The scores are computed using equation 2 above. Taking column 1 as an example, the weight set having the highest score for UE position number 1 is weight set 1 with a score of 90. Because weight set 1 has the highest score for UE position number 1, weight set 1 can be associated with UE position number 1 and the spatial stream data designated to be transmitted by the emulated RU function of test system 100. Using weight set 1 can be identified as being directed to the UE corresponding to UE position number 1.

Figure 4:
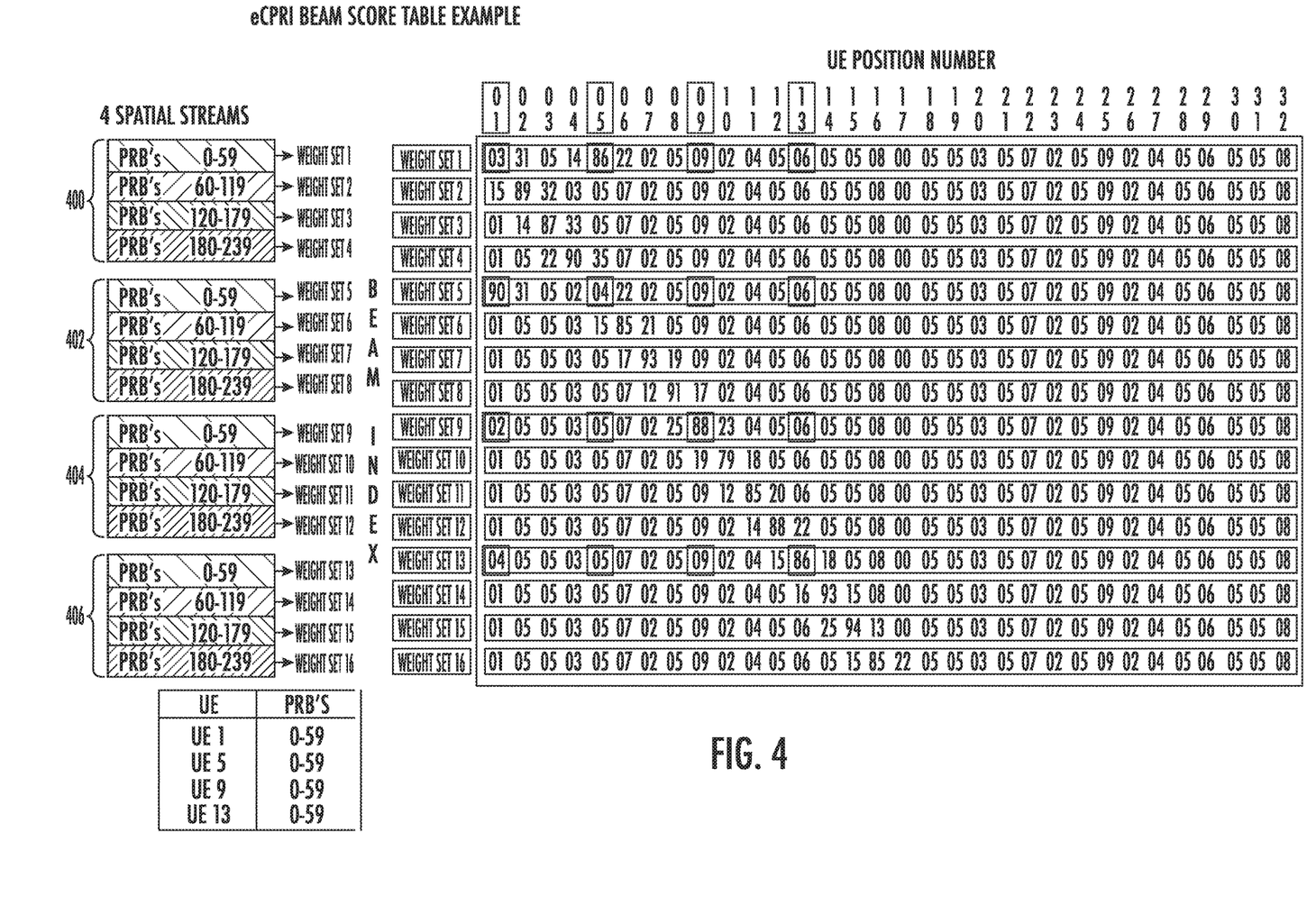
FIG. 4 is a diagram illustrating the use of the beam score table by the test system to associate spatial streams with UEs.
Figure 5:
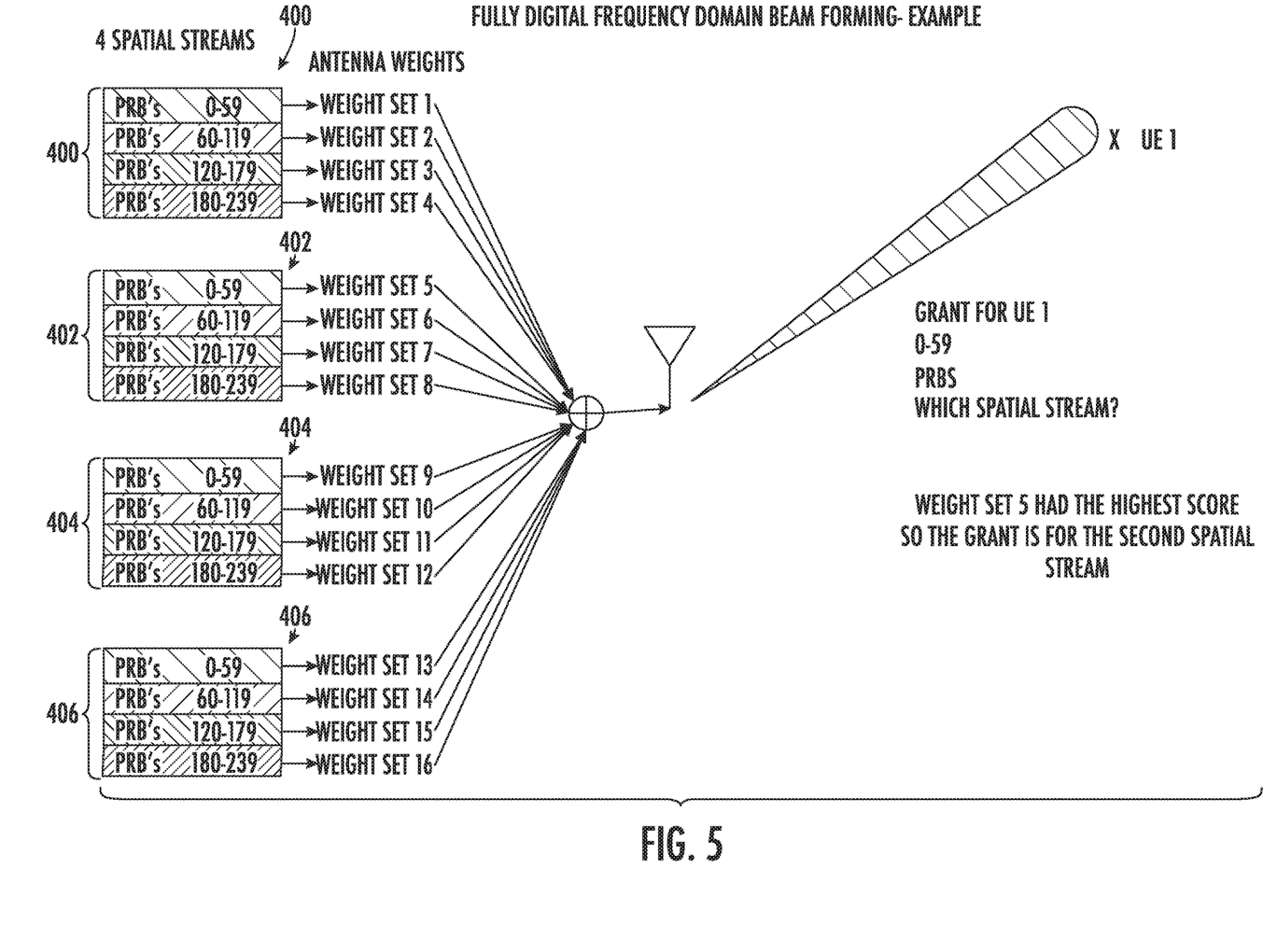
FIG. 5 is a diagram illustrating the use of beam weight sets to correlate UEs with spatial streams.

FIG. 4 illustrates another example of a beam score table and how the scores in the beam score table are used to associate spatial streams with UEs. In FIG. 4, four spatial streams 400, 402, 404, and 406 are transmitted from the DUT to the test system. Each spatial stream includes physical resource blocks (PRBs) that are intended for particular UEs. In this example, it is known that UE 1, UE 5, UE 9 and UE 13 are each designated to receive PRBs 0-59. This information is communicated by the DUT to the test system over the control channel. However, it is not known which spatial stream contains data for each UE. This determination is made using the scores in the score table. Taking UE 1 as an example, weight sets 1, 5, 9, and 13 are designated by the DUT to transmit PRBs 0-59 in different spatial streams. From the score table, weight set 5 has the highest score for UE 1. Weight set 5 is designated by the DUT to transmit PRBs 0-59 in spatial stream 402. Accordingly, the test system processes the data in PRBs 0-59 from spatial stream 402 using emulated UE 1. FIG. 5 illustrates the results of identifying spatial stream 402 as being associated with UE 1. In FIG. 5, PRBs 0-59 in spatial stream 402 are forwarded to emulated UE 1 for processing because weight set 5 which is associated with PRBs 0-59, and spatial stream 402 has the highest score in column 1 of the score table.

Returning to FIG. 4, the second UE to receive a grant of PRBs 0-59 is UE 5. Referring to the score table, in the column for UE number 5, the weight set used to encode PRBs 0-59 having the highest score for number 5 is weight set number 1. Weight set number 1 is designated by the DUT to transmit PRBs 0-59 in spatial stream 400. Accordingly, PRBs 0-59 in spatial stream 400 are identified as being directed to UE and processed by UE number 5 to generate a response to the device under test.

UE 9 is the next UE receiving a grant of PRBs 0-59. Referring to the column corresponding to UE 9 in the score table, weight set 9 has the highest (88) score for UE 9. Weight set 9 is designated by the DUT to be used to transmit PRBs 0-59 in spatial stream 404. Accordingly, the data in PRBs 0-59 in spatial stream 404 are forwarded to UE 9 for processing.

UE 13 is the last UE that receives data in PRBs 0-59. In the illustrated example, weight set 13 has the highest score for UE 13. Weight set 13 is designated by the DUT to be used to encode PRBs 0-59 in spatial stream 406. Accordingly, the data in PRBs 0-59 in spatial stream 406 are forwarded to UE 13 for processing.

Figure 6:
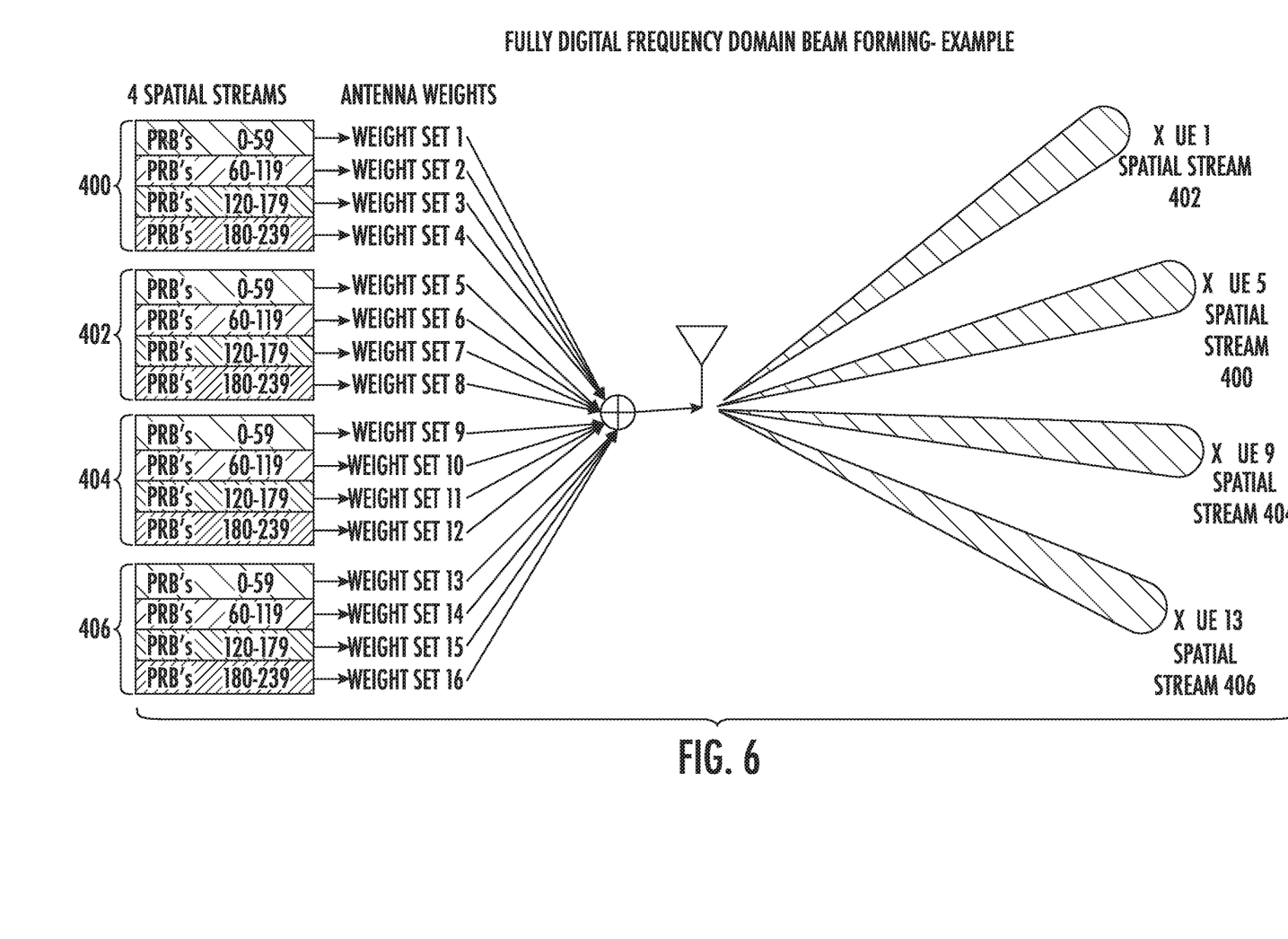
FIG. 6 is a diagram illustrating the use of beam weight sets to correlate UEs with spatial streams.

FIG. 6 illustrates the results of assigning the spatial streams to the different UEs. In the illustrated example, UE 1 receives PRBs 0-59 from spatial stream 402, UE 5 receives PRBs 0-59 from spatial stream 400, UE 9 receives PRBs 0-59 from spatial stream 404, and UE 13 receives data from spatial stream 406. It should be noted that the test system illustrated in FIGS. 1 and 2 does not use the beam weights to transmit the data wirelessly to the emulated UEs. Instead, test system 100 uses the beam weights to identify which data goes to which UE, and the associated emulated UE generates a response to send to the device under test.

Figure 7:
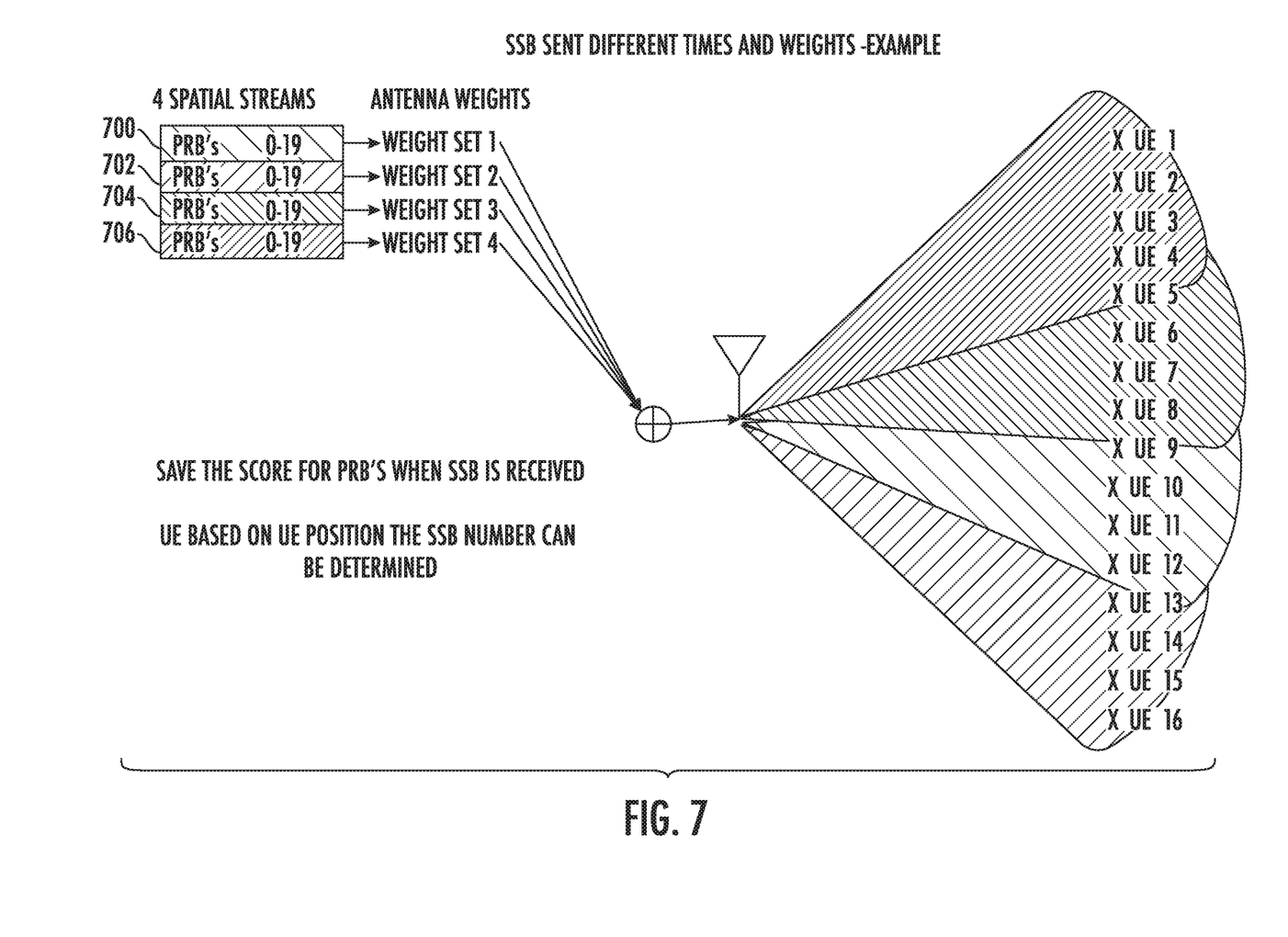
FIG. 7 is a diagram illustrating the use of beam weight sets to identify SS block signals that are strongest for particular emulated UEs.

According to another aspect of the subject matter described herein, test system 100 may monitor emulated UE synchronization signal block (SSB) transmissions from the DUT, identify a serving SSB for each emulated UE by correlating a phase vector for the emulated UE with each SSB beam and may attach to the DUT by sending a physical random access channel (PRACH) preamble to the DUT in a time slot corresponding to the SSB identify as a serving SSB for the UE. FIG. 7 illustrates this process. In FIG. 7, the DUT sends 4 spatial streams 700, 702, 704, and 706 to test system 100 and the corresponding beam weight sets to be used to transmit the spatial streams to the emulated UEs. Test system 100 computes scores for each beam weight set using the phase vectors in the same manner described above with regard to the beam weight sets received in the sounding reference symbols. The beam weight set having the highest score is used to identify the spatial stream assigned to a particular UE. The test system causes the emulated UE corresponding to the weight set having the highest score to initiate a 5G UE attach procedure by sending a PRACH preamble to the DUT in the time slot of the corresponding spatial stream.

Figure 8:
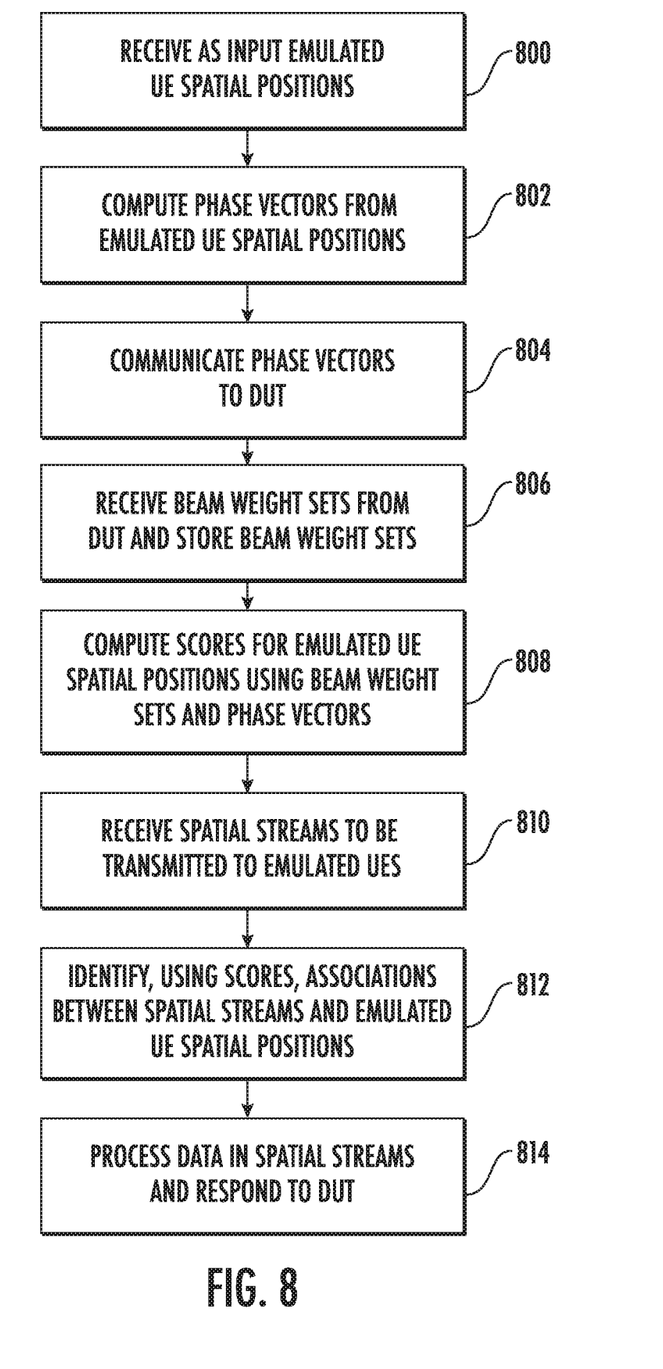
FIG. 8 is a flow chart illustrating an exemplary process for 5G digital beamforming testing.

FIG. 8 is a flow chart illustrating an exemplary process for 5G beamforming testing. Referring to FIG. 8, in step 800, the test receives as input, UE spatial positions. For example, test system 100 may receive as input, azimuth and elevation parameters input by a user. In another example, the user may input Cartesian coordinate values specifying the spatial position of an emulated UE relative to an antenna.

In step 802, the test system computes phase vectors from the emulated UE positions. Each phase vector is an indication of the relative phase of the emulated UE position to the emulated RU antenna elements. The phase vectors may be stored in memory of test system 100.

In step 804, the test system communicates the phase vectors to the DUT. As illustrated in FIG. 1, the phase vectors can be used to generate sounding reference symbols, and the sounding reference symbols can be transmitted to the DUT. The DUT uses the sounding reference symbols to perform channel estimation for emulated spatial channels for each emulated UE and generate beam weight sets for each emulated spatial channel. The DUT sends the beam weight sets to the RU emulator and multi-UE emulator.

In step 806, the beam weight sets are received from the DUT and stored. For example, test system 100 may receive the beam weight sets and corresponding beam indexes and store the beam weight sets and indexes in a table. At this point, the DUT does not know which beam weight set corresponds to which emulated UE.

In step 808, the test system computes scores for emulated UE spatial positions using the beam weight sets and the phase vectors. The scores may be calculated using equation 2 above. The scores may be stored in a beam score table, for example, as illustrated in FIG. 3.

In step 810, the test system receives spatial streams to be transmitted to the emulated UEs. The spatial streams include data in physical resource blocks. The test system also receives identifiers of weight sets to be used in transmitting the spatial streams.

In step 812, the test system identifies, using the scores, associations between spatial streams and emulated UE spatial positions. For example, test system 100 may identify the weight set having the highest score in the score table as being associated with an emulated UE spatial position. This weight set is then used to identify the spatial stream designated for that UE.

In step 814, the test system processes data in the spatial streams and responds to the DUT. For example, after identifying which spatial stream goes to which emulated UE, the test system can generate an appropriate response using the state information stored for a given emulated UE.

Thus, using the subject matter described herein, the test system is able to emulate multiple UEs and an RU to test the channel estimation and corresponding beamforming parameter generation capabilities of a device under test. By using beam weight sets to correlate spatial stream data with UEs, the test system described herein solves the problem of identifying which emulated UE is associated with a particular spatial stream. Using beam weight sets and corresponding phase vectors to correlate spatial streams with UEs is advantageous because the search space required to identify an association between an UE and spatial stream is reduced over other approaches, such as a brute force approach where each emulated UE attempts to decode application layer information in each spatial stream to determine whether the messaging from the CU/DU is intended for the particular emulated UE. Because of the efficiency achieved using the subject matter described herein, processing resources of the RU emulator and multi-UE emulator are conserved. As a result, the RU emulator and multi-UE emulator can emulate more UEs for a given amount of hardware processing power.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for 5G digital beamforming testing, the method comprising:
 receiving, as input, emulated user equipment (UE) spatial positions for a plurality of emulated UEs;

computing phase vectors for the emulated UEs based on the emulated UE spatial positions;

communicating the phase vectors to a device under test (DUT);

receiving beam weight sets from the DUT and storing the beam weight sets;

computing scores for the emulated UE spatial positions from the beam weight sets and the phase vectors;

receiving, from the DUT, a plurality of spatial streams and identifiers of beam weight sets to be used to transmit the spatial streams to the emulated UEs;

identifying, using scores corresponding to the beam weight sets to be used to transmit the spatial streams to the emulated UEs, associations between the spatial streams and the emulated UE spatial positions; and processing data in the spatial streams using the emulated UEs whose emulated spatial positions are identified as being associated with the spatial streams and responding to the DUT based on the data.

2. The method of claim 1 wherein computing the phase vectors comprises, for each of the emulated UEs, computing a set of phase values indicative of an emulated spatial channel between an emulated UE spatial position and emulated radio unit (RU) antenna elements of an emulated RU antenna array.

3. The method of claim 1 wherein communicating the phase vectors to the DUT includes using the phase vectors to generate sounding reference symbols (SRSs) and transmitting the SRSs to the DUT.

4. The method of claim 3 wherein receiving the beam weight sets from the DUT includes receiving the beam weight sets from the DUT in response to the SRSs.

5. The method of claim 1 wherein computing the scores includes computing an array factor for each emulated UE spatial position and beam weight set, where the array factor indicates an antenna gain of a spatial stream given by a beam weight set to be used to transmit the spatial stream in a direction corresponding to the phase vector for the emulated UE position.

6. The method of claim 1 wherein identifying associations between the spatial streams and the emulated UE spatial positions includes:

determining, from control channel information received from the DUT, a set of emulated UEs that have physical resource block (PRB) grants in the spatial streams;

for each emulated UE in the set of emulated UEs that has PRB grants in the spatial streams, performing a lookup in a score table using the identifiers for the beam weight sets to be used to transmit the spatial streams to the emulated UEs and identifying a set of scores for each beam weight set-emulated UE combination;

identifying, from the set of scores for each emulated UE that has PRB grants in the spatial streams, a highest score and a corresponding one of the beam weight sets to be used to transmit the spatial streams; and selecting one of the spatial streams, which corresponds to the beam weight set having the highest score for an emulated UE of the set of emulated UEs, as the spatial stream having PRB grants for the emulated UE of the set of emulated UEs.

7. The method of claim 6 wherein processing the data in the spatial streams comprises extracting data from the PRBs in the one spatial stream identified has having PRB grants for the emulated UE and using the data to formulate a response to the DUT.

8. The method of claim 1 wherein the DUT comprises a 5G distributed unit (DU), a 5G central unit (CU), or a combination of a 5G DU and CU.

9. The method of claim 1 wherein the steps are implemented by a combined radio unit (RU) emulator and multi-UE emulator.

10. The method of claim 1 comprising:

monitoring, by each of the emulated UEs, emulated UE synchronization signal block (SSB) transmissions from the DUT;

identifying a serving SSB for each emulated UE spatial position by correlating a phase vector for the emulated UE with all active SSB beams;

initiating, by each of the emulated UEs, a 5G UE attach procedure by sending a physical random access channel (PRACH) preamble to the DUT in a time slot corresponding to the SSB beam identified as the serving SSB beam for a UE.

11. A test system for 5G digital beamforming testing, the test system comprising:

at least one processor; and a radio unit (RU) emulator and multi-user equipment (UE) emulator implemented by the at least one processor for receiving, as input, emulated UE spatial positions for a plurality of emulated UEs, computing phase vectors for the emulated UEs based on the emulated UE spatial positions, communicating the phase vectors to a device under test (DUT), receiving beam weight sets from the DUT and storing the beam weight sets, computing scores for the emulated UE spatial positions from the beam weight sets and the phase vectors, receiving, from the DUT, a plurality of spatial streams and identifiers of beam weight sets to be used to transmit the spatial streams to the emulated UEs, identifying, using scores corresponding to the beam weight sets to be used to transmit the spatial streams to the emulated UEs, associations between the spatial streams and the emulated UE spatial positions, and processing data in the spatial streams using the emulated UEs whose emulated spatial positions are identified as being associated with the spatial streams and responding to the DUT based on the data.

12. The test system of claim 11 wherein the RU emulator and multi-UE emulator is configured to compute the phase vectors by computing, for each of the emulated UEs, a set of phase values indicative of an emulated spatial channel between an emulated UE spatial position and emulated radio unit (RU) antenna elements of an emulated RU antenna array.

13. The test system of claim 11 wherein the RU emulator and multi-UE emulator is configured to use the phase vectors to generate sounding reference symbols (SRSs) and transmit the SRSs to the DUT.

14. The test system of claim 13 wherein the RU emulator and multi-UE emulator is configured to receive the beam weight sets from the DUT in response to the SRSs.

15. The test system of claim 11 wherein the RU emulator and multi-UE emulator is configured to compute the scores by computing an array factor for each emulated UE spatial position and beam weight set, where the array factor indicates an antenna gain of a spatial stream given by a beam weight set to be used to transmit the spatial stream in a direction corresponding to the phase vector for the emulated UE position.

16. The test system of claim 11 wherein the RU emulator and multi-UE emulator is configured to identify associations between the spatial streams and the emulated UE spatial positions by:
- determining, from control channel information received from the DUT, a set of emulated UEs that have physical resource block (PRB) grants in the spatial streams;
- for each emulated UE in the set of emulated UEs that has PRB grants in the spatial streams, performing a lookup in a score table using the identifiers for the beam weight sets to be used to transmit the spatial streams to the emulated UEs and identifying a set of scores for each beam weight set-emulated UE combination;
- identifying, from the set of scores for each emulated UE that has PRB grants in the spatial streams, a highest score and a corresponding one of the beam weight sets to be used to transmit the spatial streams; and
- selecting one of the spatial streams, which corresponds to the beam weight set having the highest score for an emulated UE of the set of emulated UEs, as the spatial stream having PRB grants for the emulated UE of the set of emulated UEs.

17. The test system of claim 16 wherein the RU emulator and multi-UE emulator is configured to process the data in the spatial streams by extracting data from the PRBs in the one spatial stream identified has having PRB grants for the emulated UE and using the data to formulate a response to the DUT.

18. The test system of claim 11 wherein the DUT comprises a 5G distributed unit (DU), a 5G central unit (CU), or a combination of a 5G DU and CU.

19. The test system of claim 11 wherein the RU emulator and multi-UE emulator is configured to:
- monitor, by each of the emulated UEs, emulated UE synchronization signal block (SSB) transmissions from the DUT;
- identify a serving SSB for each emulated UE spatial position by correlating a phase vector for the emulated UE with all active SSB beams;
- initiate, by each of the emulated UEs, a 5G UE attach procedure by sending a physical random access channel (PRACH) preamble to the DUT in a time slot corresponding to the SSB beam identified as the serving SSB beam for a UE.

20. A non-transitory computer readable medium having stored thereon executable instructions that when executed by a processor of a computer control the computer to perform steps comprising:
- receiving, as input, emulated user equipment (UE) spatial positions for a plurality of emulated UEs;
- computing phase vectors for the emulated UEs based on the emulated UE spatial positions;
- communicating the phase vectors to a device under test (DUT);
- receiving beam weight sets from the DUT and storing the beam weight sets;
- computing scores for the emulated UE spatial positions from the beam weight sets and the phase vectors;
- receiving, from the DUT, a plurality of spatial streams and identifiers of beam weight sets to be used to transmit the spatial streams to the emulated UEs;
- identifying, using scores corresponding to the beam weight sets to be used to transmit the spatial streams to the emulated UEs, associations between the spatial streams and the emulated UE spatial positions; and
- processing data in the spatial streams using the emulated UEs whose emulated spatial positions are identified as being associated with the spatial streams and responding to the DUT based on the data.

* * * * *